3 Sheets—Sheet 1.
T. H. MOTT.
Calendar-Clocks.
No. 196,375. Patented Oct. 23, 1877.
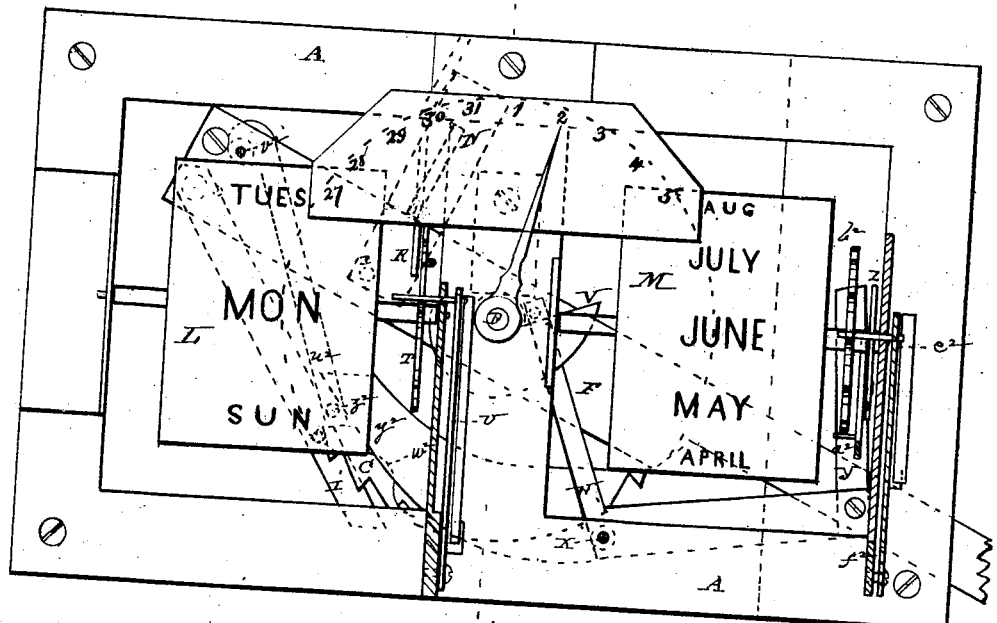
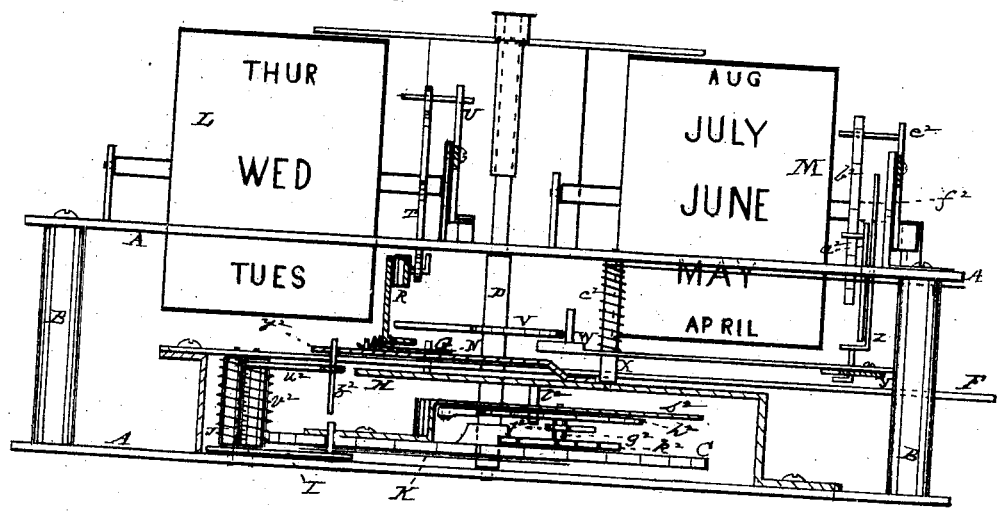

3 Sheets—Sheet 2.

T. H. MOTT.
Calendar-Clocks.

No. 196,375. Patented Oct. 23, 1877.

3 Sheets—Sheet 3.
T. H. MOTT.
Calendar-Clocks.
No. 196,375. Patented Oct. 23, 1877.
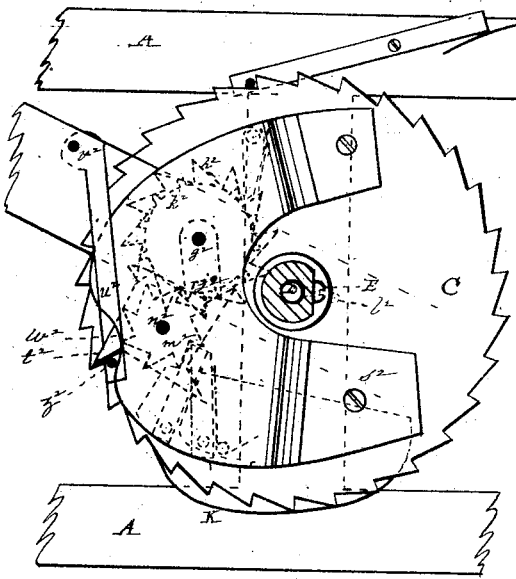
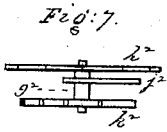
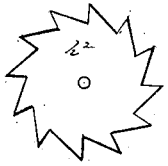
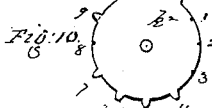
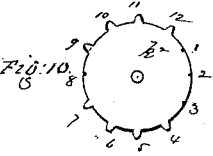
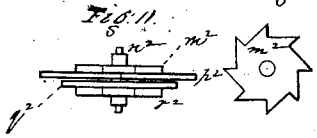
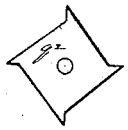
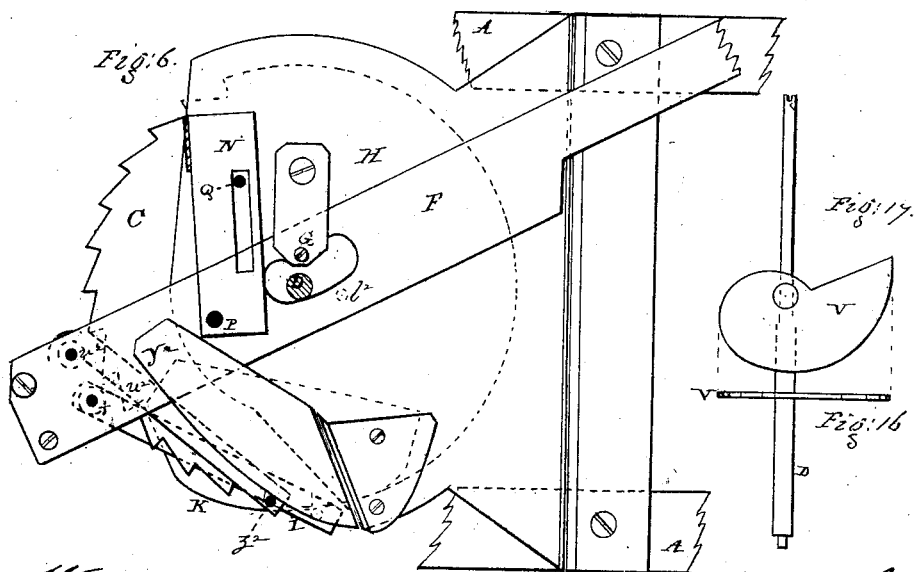
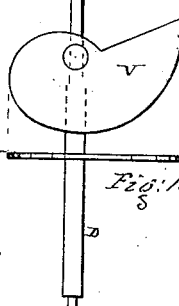
Witnesses
Charles H. Barrett
J. W. Munson
Inventor
Thomas H. Mott
N. PETERS, PHOTO-LITHOGRAPHER, WASHINGTON, D.C.

UNITED STATES PATENT OFFICE.

THOMAS H. MOTT, OF NEW YORK, N. Y.

IMPROVEMENT IN CALENDAR-CLOCKS.

Specification forming part of Letters Patent No. 196,375, dated October 23, 1877; application filed August 17, 1877.

*To all whom it may concern:*

Be it known that I, THOMAS H. MOTT, of the city, county, and State of New York, have invented certain new and useful Improvements in Perpetual Calendars for registering the days, weeks, and months; and I do hereby declare the following to be a full, clear, and exact description of the same, reference being had to the accompanying drawings, forming a part of this specification—the same letters of reference wherever they occur referring to similar parts.

Figure 3:
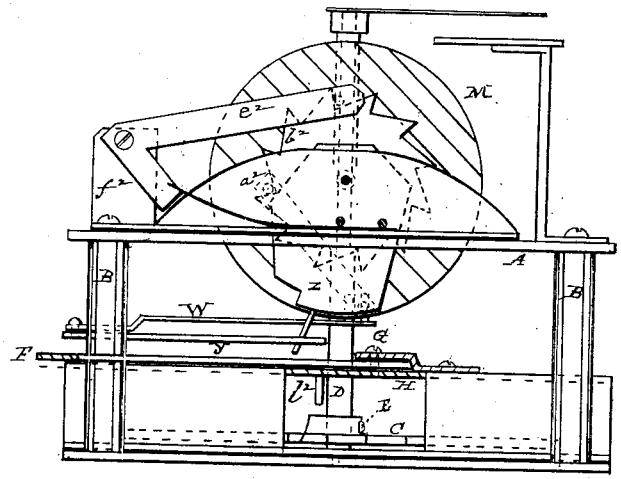
Figure 4:
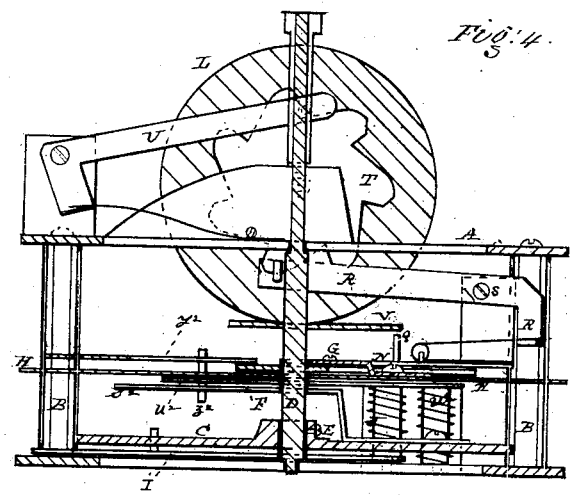

Figure 1, Sheet 1, is a plan view of the calendar. Fig. 2, Sheet 1, is a front elevation of the same. Fig. 3, Sheet 2, is an end view of the same, looking at the month-register. Fig. 4, Sheet 2, is a vertical cut section of the same through the line $x'$ $x'$, Fig. 1, looking toward the day-register. Fig. 5, Sheet 3, is a detached plan view of the day-registering wheel, showing in dotted outlines the week, month, and annual registering wheels secured thereon. Fig. 6, Sheet 3, is a plan view of the day-registering wheel, showing the lever connecting with the clock-work movements, and pawls for operating the registering-wheel. Fig. 7, Sheet 3, is a detached side elevation of the month and year registering spindle and toothed wheels solidly secured thereon. Fig. 8, Sheet 3, is a detached plan view of the month-registering wheel. Fig. 9, Sheet 3, is a detached plan view of the year-registering two-toothed lever or wheel. Fig. 10, Sheet 3, is a detached plan view of the short-month-registering toothed wheel. Fig. 11, Sheet 3, is a detached side view of the spindle and short-months and leap-year registering wheels, in which the wheels 12 and 13 (shown in plan views) are solidly joined together as one wheel, and as is also the case with the wheels 14 and 15. Figs. 16 and 17, Sheet 3, are side and plan views of the index-pointer spindle, and cam attached thereto for transmitting motion to the monthly-registering roller.

My invention relates to that class of clock-work movements called "perpetual calendars," in which are automatically indicated, on suitable dials, the diurnal, weekly, and monthly changes of time, as they are usually divided, in perpetual succession.

The invention consists in the means herein-after fully set forth and described, and pointed out in the claims.

Letter A represents the frame of the apparatus, composed of an upper and lower plate, with a transverse middle bar, and joined together by the posts B in the usual manner of securing together the upper and lower plates of clock-frames. Upon the lower transverse middle bar is centered a diurnal registering ratchet-wheel, C, having its edge divided into thirty-one teeth. Letter D is the index-spindle, secured to the wheel C by a set-screw, and upon which the same is rotated. This rotation of the wheel C is effected by means of a lever, F, secured by a center-pin, G, upon the upper surface of a cap-plate, H, extending over the greater portion of the registering-wheel C. The outer end of this lever is attached to a lever leading to the movements of an ordinary hour-registering clock, so that at the end of each twenty-four hours by the clock the lever F will vibrate sufficient to move forward the wheel C one tooth or one day. This is effected by means of the pawl I secured to the inner end of the lever F, and made to engage in the teeth of the wheel C by a spring, J, acting against the back edge of the pawl, thus, at each vibration of the lever moving forward the wheel C one tooth. To prevent the pawl from taking more than one tooth, or taking it too far back, in consequence of the extent of vibration in the lever, a shield, K, is secured to the transverse middle bar of the frame, just under the wheel C, and of such a curvature of outline as to blank about six teeth on the wheel, and thereby prevent the pawl from engaging into the teeth too far back, and moving the wheel more than one tooth or one day, as noted by the clock.

The registering of the daily and monthly changes of time upon the rotating dials L and M is effected by the following-described means: For that of the days, a slotted lever, N, is secured at one corner, by a center-pin, P, to the upper side of the lever F, (see Fig. 6,) and made to vibrate at right angles to the axis of the dial-roller L, by means of a fixed or stationary pin, Q, secured into the upper surface of the cap-plate H, and projecting up through the slot in N. To the outer upper end of the lever N is secured a spring-pawl, R, by a center-pin, S. The inner end of this pawl has a hook or other suitable device for taking into the teeth or notches of a wheel, T, secured on the axis of the day-recording roller. This wheel has seven teeth on it, to represent the seven days of the week. It will be obvious that at each vibration of the lever F a day will be recorded on the dial L. For the purpose of preventing backlash in the dial L, a check-spring pawl, U, is secured by a center-pin to a standard on the upper plate of the frame A. This causes the inner end of the pawl to act on the teeth of the wheel T, on the upper and opposite side from that of the propelling-pawl R, and thus holds the roller in check at all times.

The rotating of the month-recording dial or roller M is effected by means of a cam, V, on the index-spindle D, having a gradually-increasing curve throughout half its circle, and terminating in an abrupt radial line to or near its center. The object of this is to cause the bell-crank W, working on the center-pin X and through the connecting-levers Y and Z, to vibrate far enough to cause the pawl $a^2$ on the lever Z to take up one tooth of the month-recording ratchet-wheel $b^2$, secured on the axis of the month-recording roller M. When this has been effected, the pin in the end of the bell-crank lever W slips off the point of the cam V. When this is done, the spring $c^2$ on the center-pin X causes the readjustment of the levers, and the rotation of the month-recording roller one degree or month. As the ratchet-wheel $b^2$ is notched with twelve teeth, it will be obvious that at each entire revolution is recorded a year on the dial. To prevent any tendency to backlash a check-pawl, $e^2$, is secured to a standard, $f^2$, on the upper plate of the frame A, by a center-pin, so as to permit the inner end of the pawl to engage in the teeth of the ratchet-wheel $b^2$, and thus prevent all possibility of its slipping a degree backward.

As will be obvious, the apparatus thus far described would only record the months composed of thirty-one days. To make the apparatus self-discriminating as to the number of days composing the different months in the year, the following-described means are used:

On a spindle, $g^2$, Fig. 7, is secured, on its upper end, and solidly thereto, a ratchet-wheel, $h^2$, composed of twelve teeth; also, in a like manner, a little below the wheel $h^2$, a bifurcated lever, $j^2$, and a mutilated-toothed wheel, $k^2$, at its lower end, having three blanks on one side of the wheel and one blank on the opposite side, thus leaving four teeth on opposite halves of the wheel. These several parts are all rotated at the same time, by means of a fixed or stationary pin, $l^2$, Fig. 2, secured into and projecting down from the lower side of the cap-plate H, against which the teeth of the ratchet-wheel $h^2$ come in contact at each revolution of the main ratchet-wheel C, on the upper face of which the ratchet-wheel $h^2$ is rotated on the spindle $g^2$. Thus it will be obvious that, as the ratchet-wheel $h^2$ has twelve teeth, and comes in contact with the pin $l^2$ but once in each revolution of the wheel C, it will take twelve revolutions, representing one year's time, to rotate the ratchet-wheel $h^2$ once. As the bifurcated lever $j^2$ and mutilated-toothed wheel $k^2$ are solidly attached to the same spindle, it will follow, of course, that they will only be called into action at discriminating times. Thus the bifurcated lever comes into action but once during the rotation of the wheel $h^2$. It then engages into one tooth of an eight-toothed wheel, $m^2$, on a second spindle, $n^2$, secured upon the upper face of the ratchet-wheel C, so as to rotate with it on its own axis. This ratchet-wheel $m^2$ is solidly joined to a ratchet-wheel, $p^2$, having four teeth, so that the two, being loosely adjusted on the spindle, always rotate together and independent of the rotation of the four-toothed ratchet-wheel $q^2$ and eight-toothed ratchet-wheel $r^2$, solidly united together and to the spindle $n^2$ on its lower end. These several wheels are shown in detached parts, Figs. 7 to 15, inclusive.

When the bifurcated lever engages into the ratchet-wheel $m^2$, as represented in dotted lines, Fig. 5, it rotates it forward two teeth for each year, and with it the four-toothed wheel $p^2$. This wheel is to discriminate the month of February for the ordinary and bissextile years. Thus each of the three teeth on it is about twice the length of the fourth tooth. The long teeth are to discriminate the twenty-eight days for February, and the short tooth the twenty-nine days for leap-year. This is effected in this manner: The horseshoe-shaped cap-plate $s^2$, forming the upper plate for holding the two series of wheels on the spindles $g^2$ and $n^2$, has a curved indentation on its edge, directly opposite the spindle $n^2$, as shown at $w^2$, Fig. 5, so as to expose the teeth on $p^2$ as they come round each year, as shown at $t^2$. This permits the pin in the outer end of the pawl $u^2$, secured to the vibrating lever F by the center-pin $v^2$, to engage into the exposed tooth, which, by its great length, keeps its connection therewith until four degrees or days are carried forward on the main ratchet-wheel C, thus counting the month a twenty-eight-day month, though the entire circuit of the wheel C has been made. This follows in succession during three revolutions of the bifurcated lever, when the short or fourth tooth is rotated forward. As will be seen, the pin $z^2$ of the pawl $u^2$ will not engage the short tooth as soon as it would the long tooth, on account of the curvature of the shield $y^2$. This allows the main wheel C to make one more day, or twenty-nine days for February, before rotating the wheel C to the first of the next month, thereby counting the long or leap year.

To count the thirty-days months, April, June, September, and November, a mutilated wheel, $k^2$, is secured solidly on the lower end of the spindle $g^2$. The edge of this wheel is divided, to represent points for twelve teeth, thus: four teeth, then followed by three blanks, then by four teeth followed by one blanked tooth, as represented in Fig. 10. By means of the teeth on this wheel, an eight-toothed ratchet-wheel, $r^2$, and a four-pointed wheel, $q^2$, combined therewith, are simultaneously rotated with the spindle $n^2$, upon which they are solidly secured, while the combined wheels $m^2$ and $p^2$ on its upper end stand still.

The operation of these several parts is as follows: The mutilated wheel $k^2$ is numbered on its periphery 1 to 12, inclusive, (for reference,) to represent the twelve months of the year. No. 1 is a blank, and does not act to rotate the ratchet-wheel $r^2$. This permits the pawl I to rotate the main ratchet-wheel C, and count thirty-one days for January. No. 2 also represents a blank, and, of course, does not act on the wheel $r^2$; but, instead thereof, the bifurcated lever $j^2$ has been rotated, so as to act upon the ratchet-wheel $m^2$, and rotates forward one of the four points $t^2$ of the wheel $p^2$. This enables the pawl $u^2$ to engage on it to carry forward the main ratchet-wheel C four teeth, to count the short month of February. In this operation the pawl I does not act upon the ratchet-wheel C to rotate it, because of the curve of the shield $Y^2$ on cap-plate H, against the outer edge of which the pawl $u^2$ acts to engage one of the teeth of the wheels $p^2$ or $q^2$ when projected out beyond the edge of the indenture $w^2$ of the cap-plate $s^2$, to carry forward the main ratchet-wheel C two, three, or four teeth, according to the month to be registered. No. 3 also represents a blank. This leaves the ratchet-wheel $r^2$ at rest, and, of course, allows the pawl I to come into action to rotate the main wheel C to count its full number of teeth, to represent the month of March. The tooth No. 4 now engages into the teeth of the ratchet-wheel $r^2$, and rotates forward one of the four points or teeth on $q^2$, so as to be exposed beyond the outline of the curved indentation $w^2$ of the cap-plate $s^2$. This permits the pawl $u^2$ to come into operation again, instead of the pawl I, to rotate the main ratchet-wheel C, by reason of the curve of the shield-plate $Y^2$, which allows the pawl $u^2$ to engage the point on $q^2$ before the pawl I can engage the teeth on C, and thus carries the wheel C forward two teeth at a single vibration of the main lever F. By this means but thirty days are counted for the month of April.

It will be obvious that as the wheel $k^2$ rotates the Nos. 5, 6, 7, 8, 9, 10, 11, and 12, representing in succession the months of May, June, July, August, September, October, November, and December, will repeat the operations above described, and it is therefore not deemed necessary to a proper understanding of the operations of the invention to add the cumulative description of the entire rotation of the wheel $k^2$.

Having now described my invention, I will proceed to set forth what I claim and desire to secure by Letters Patent of the United States:

1. The combination of the main ratchet-wheel C with the spindle $g^2$, ratchet-wheel $h^2$, bifurcated lever $j^2$, and mutilated wheel $k^2$, as and for the purposes set forth.

2. The combination of the spindle $n^2$ with the ratchet-wheel $m^2$ and four-pointed wheel $p^2$ united together as one wheel, and having a rotating motion on the spindle, as and for the purposes set forth.

3. In combination with the spindle $n^2$, the ratchet-wheel $r^2$ and four-pointed wheel $q^2$, united together and rotating with the spindle, as and for the purposes set forth.

4. The combination of the bifurcated lever $j^2$ and mutilated wheel $k^2$ with the ratchet-wheels $m^2$ and $r^2$, and four-pointed wheels $p^2$ and $q^2$, on the spindle $n^2$, as arranged in pairs, and rotating in the manner substantially as set forth.

5. The combination of the main ratchet-wheel C with the cap-plate $s^2$, having a curved indentation, $w^2$, on its edge, as and for the purposes set forth.

6. The combination of the main ratchet-wheel C with the shield-plate K, as and for the purposes set forth.

7. The combination of the main ratchet-wheel C with the shield K, spring-pawl I, and motive-power lever F, as and for the purposes described.

8. The combination of the curved indenture $w^2$ in the cap-plate $s^2$ with the pawl $u^2$ and motive-power lever F, as and for the purposes set forth.

9. The combination of the main ratchet-wheel C with the ratchet-wheel $h^2$, stationary pin $l^2$, and cap-plate H, as and for the purposes set forth.

10. The combination of the motive-power lever F with the horizontal-vibrating slotted lever N and stationary pin Q, as and for the purposes set forth.

11. The combination of the motive-power lever F, slotted lever N, stationary pin Q, with the spring-pawl R, check-spring pawl U, and day-registering ratchet-wheel T, substantially as and for the purposes set forth.

12. The combination of the main ratchet-wheel C with the index-spindle $d^2$, cam V, attached thereto, bell-crank lever W, connecting-levers Y and Z, ratchet-wheel $b^2$, and propelling and check pawls $a^2$ and $e^2$, for operating the month-recording dial, substantially as and for the purposes described.

13. The combination of the shield $Y^2$ with the wheels $p^2$ and $q^2$, pawl $u^2$, and vibrating lever F, substantially as and for the purposes described.

THOMAS H. MOTT.

Witnesses:
CHARLES L. BARRITT,
R. ROWLEY.